C. PACK AND H. H. DOEHLER.
METHOD OF MAKING BEARINGS.
APPLICATION FILED NOV. 15, 1918.
1,333,337.
Patented Mar. 9, 1920.
2 SHEETS—SHEET 1.
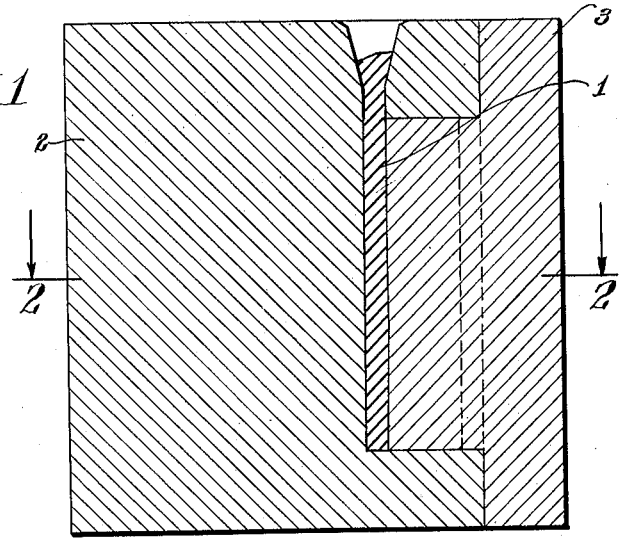
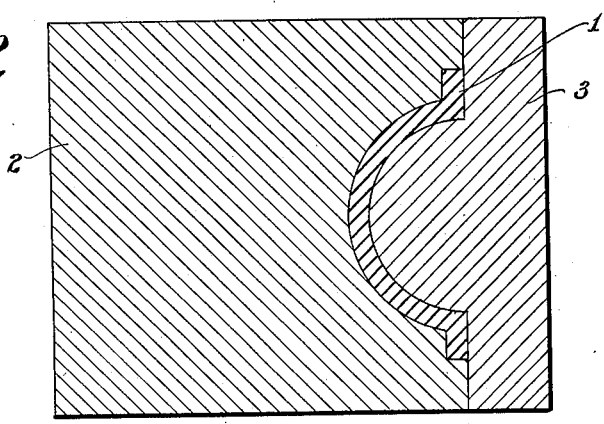
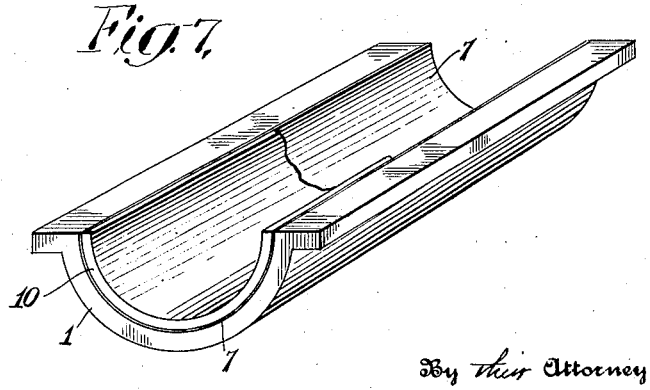
Inventor
Charles Pack
Herman H Doehler
By their Attorney C. PACK AND H. H. DOEHLER.
METHOD OF MAKING BEARINGS.
APPLICATION FILED NOV. 15, 1918.
1,333,337.
Patented Mar. 9, 1920.
2 SHEETS—SHEET 2.
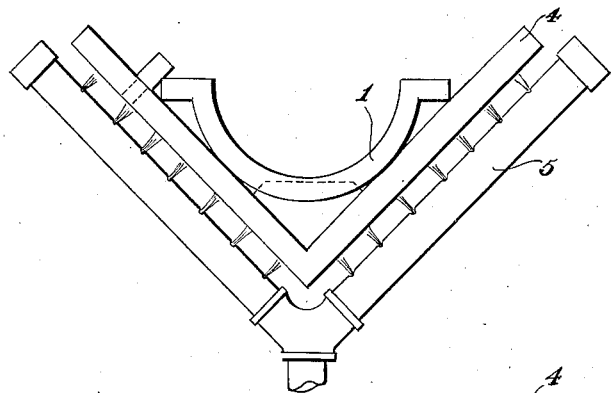
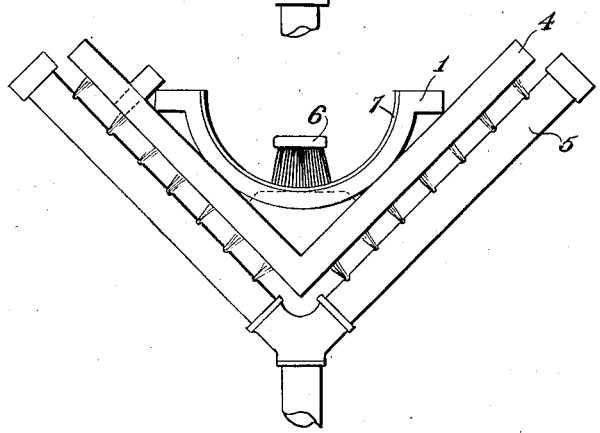
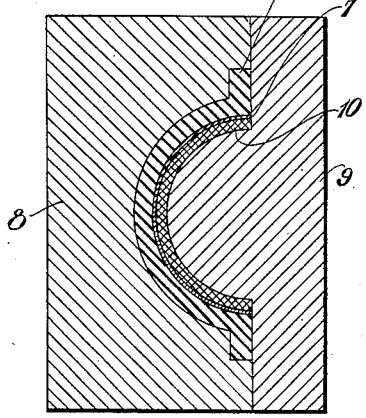
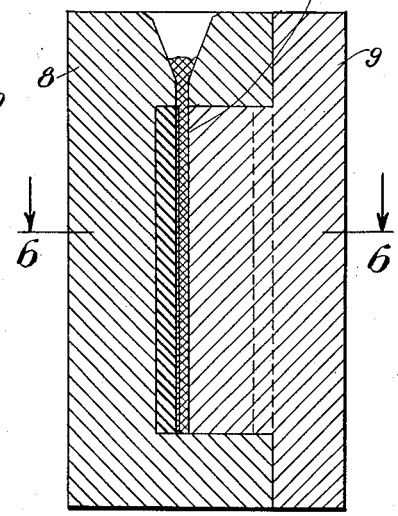

UNITED STATES PATENT OFFICE.

CHARLES PACK AND HERMAN H. DOEHLER, OF BROOKLYN, NEW YORK, ASSIGNORS TO DOEHLER DIE CASTING COMPANY, OF BROOKLYN, NEW YORK, A CORPORATION OF NEW YORK.

METHOD OF MAKING BEARINGS.

1,333,337.   Specification of Letters Patent.   Patented Mar. 9, 1920.

Application filed November 15, 1918. Serial No. 262,653.

*To all whom it may concern:*

Be it known that we, CHARLES PACK and HERMAN H. DOEHLER, both citizens of the United States, and residing at the borough of Brooklyn, city of New York, county of Kings, and State of New York, have invented certain new and useful Improvements in Methods of Making Bearings, of which the following is a specification.

Our invention relates to methods of making bearings of the type having an outer shell which has sufficient inherent strength to resist the crushing strains to which the bearing is subjected and a lining of anti-friction metal, the bearing in its entirety being adapted to be assembled in relation to the shaft mounted therein, and related parts without requiring any substantial fitting.

An improved bearing in which the shell is formed of an aluminum alloy, which bearing may be made by the method described and claimed herein, (although not necessarily produced by the said method), is described and claimed in our co-pending application Serial No. 182,820, filed July 26, 1917. Bearings of this general type have previously been used in which the outer shell is formed of brass or bronze, but so far as we are aware no bearings have hitherto successfully been made in which the outer shell is formed of aluminum or an alloy thereof.

A bearing having the outer shell composed chiefly of aluminum has the highly desirable property of being considerably lighter than the bearings having an outer shell of brass or bronze. Where a large number of brass-backed bearings are used in connection with a small machine, the aggregate weight of the same is considerable, and this is particularly disadvantageous in the case of bearings which are carried by moving part of a mechanism or which are used in connection with engines employed in airplanes, automobiles or other machines where the weight per H. P. of the engine is a material factor.

Various difficulties have seemed to prevent the use of aluminum in this connection. The strength of aluminum is not sufficient to resist the crushing stresses which bearings often have to withstand, unless the thickness of the aluminum part is undesirably great. It also has been found difficult to bond other metals to aluminum.

In accordance with our invention, we make the shell of an aluminum alloy in which the metal combined with the aluminum considerably increases the strength of the alloy without being present in a proportion sufficiently great to increase the weight to any considerable degree. This is preferably an alloy of aluminum with copper, and preferably one in which the copper is employed in a proportion somewhat in excess of that ordinarily employed in commercial aluminum alloy or in excess of 8%. With such an alloy, the tensile and compressive strength of the part is considerably in excess of that of aluminum, and the surface finish of the shell is also much better. The presence of a comparatively high percentage of copper in the aluminum alloy likewise facilitates the formation of a satisfactory bond between the shell and the lining therefor.

We further increase the strength and density of the aluminum alloy shell by casting the same in a metal die so that the casting will be subjected to a quick chilling which gives the shell a considerable density and a chilled surface or surfaces, thereby greatly increasing the strength. Preferably, the aluminum alloy is carefully poured into the die, by hand or equivalent means, so as to largely obviate the formation of air pockets in the casting. This process permits more efficient and economical manufacturing operations than are possible in the case of brass bearing shells which must be cast in sand or other non-metallic molds, the shells cast by our method necessarily being of uniform dimensions.

Aluminum and aluminum alloys oxidize very quickly, and the film of oxid thereon renders an efficient bonding of the same to an anti-friction metal lining extremely difficult, and difficulties are also met in the use of chemical agents for removing this oxid preparatory to forming a layer of solder thereon. We have found that we may overcome this difficulty by applying suitable solder to the shell in molten condition and thoroughly scouring the surface which is to be covered with a metal scratch brush, which applies the solder in a thin film and at the same time mechanically removes the solder oxidation sufficiently to permit the solder forming a firm bond with the shell. We have found that an effective solder for the purpose is one comprising tin as a major constituent and zinc as the minor constituent.

We further find that a proper application of heat in the various steps of the process is necessary to properly bond the lining to the shell. Accordingly, we heat the shell with the film of solder thereon to a temperature above the melting point of the solder and apply the Babbitt or anti-friction metal in molten condition to the solder-bearing surface while the solder is still molten. This results in the formation of a bearing in which the lining is effectively bonded to the shell to form a substantially unitary structure, the line of demarcation between the several strata present being imperceptible in the finished product.

A bearing so formed has considerable advantages over those previously used in addition to the property of lightness already referred to. It has the property of radiating heat more quickly than bearings having brass or bronze shells, and thereby has less tendency to become overheated than other bearings. The process by which the bearing is made results in the formation of shells, the dimensions of which are much more uniform than those of shells cast in sand, and accordingly the thickness of the babbitt lining will be more uniform, since the Babbitt metal is poured between the shell of uniform thickness, bearing a thin solder film of uniform thickness, and a metal or other member of desired configuration, which is used to form the opposite portion of the mold during the casting of the anti-friction metal. The uniformity of the articles produced contributes to a uniformly long life for the same. Also because of the possibility of proceeding in this manner, the process of manufacture will be cheaper than in the case of the prior bearings.

In order that our invention may be more readily understood, attention is hereby directed to the accompanying drawings forming a part of this application and illustrating one manner in which the process referred to may be carried out. In the drawings, Figure 1 represents a vertical section through a die in which the aluminum alloy shell is being cast; Fig. 2 is a cross section taken on line 2—2 of Fig. 1; Fig. 3 is an end elevation of the bearing mounted on a suitable fixture for heating the same; Fig. 4 is a similar view illustrating the manner of applying the solder film thereto; Fig. 5 is a vertical section through apparatus employed in casting the anti-friction metal lining in place; Fig. 6 is a cross section taken on line 6—6 of Fig. 5; and Fig. 7 is a perspective view of the finished bearing partly broken away.

Referring to the drawings, the shell 1 is illustrated as being poured into a die comprising members 2 and 3, these members being of such a material as will result in a quick chilling of the alloy cast therein, such as a suitable metal. The alloy is preferably one containing about 90% of aluminum and 10% of copper, although our invention is not limited to this exact proportion. It is noted, however, that the use of a comparatively high percentage of copper, such as that referred to, aids the formation of a satisfactory bond between the shell and the solder.

When the shell has sufficiently hardened, it is removed from the die and trimmed and placed on a fixture such as that illustrated at 4. The shell should be heated to a temperature higher than the melting point of the solder to be used before the latter is applied, the preferred temperature being one not less than 350° F. and not over 1200° F. Suitable means may be employed for heating the cast shell to the proper temperature, such as the gas pipe 5 illustrated provided with jets by which the fixture 4 is heated.

The solder is now applied to the surface of the shell which is to be provided with an anti-friction lining. This solder should be one which will bond satisfactorily to the aluminum copper alloy, such as a mixture of 85% of tin and 15% of zinc, although the process is not limited to this exact formula. While the solder is molten, the same is rubbed into the surface of the shell which is to be covered by means of a metal scratch brush 6. This operation is continued until the surface has been thoroughly scoured and the solder has been applied to the same in a thin film. This film is extremely thin, the representation of the same at 7 in the drawings being of an exaggerated thickness. The use of the metal brush in connection with the hot solder results in removing the oxidation film on the shell by the mechanical action of the brush to a sufficient extent to cause the solder to bond firmly thereto.

The shell 1 with the film 7 adhering thereto is then immediately transferred to a suitable die or fixture comprising the two relatively movable members 8 and 9. The solder film 7 is still in molten condition and is maintained in such condition by the heat of the shell 1, the latter having previously been subjected, as stated, to a heat above the melting point of the solder. The Babbitt or anti-friction metal in molten condition is then poured into the die formed by the members 8 and 9 into contact with the solder film 7. The thickness of the lining 10 thus formed will, of course, depend upon the space which is provided between the film 7 and the adjacent surface of the die member 9. When the lining 10 has sufficiently cooled and hardened the die is opened, and the completed bearing removed and trimmed. The lining will by the described process be bonded firmly to the shell through the interposed stratum of solder without any perceptible line of demarcation.

The completed bearing is illustrated in Fig. 7. It will, however, be understood that this showing is conventional, and that our invention is not in any way limited to the shape or form of the bearing produced, it being immaterial so far as our invention is concerned whether or not the lining completely covers the inner wall of the shell and whether or not the various forms of interlocks and depressions now used in applying babbitt lining to brass shells are used or not.

What we claim is:—

1. A method of making bearings, comprising, making an aluminum alloy shell by pouring the molten alloy into a metal die, and quickly chilling the same, heating the shell to a temperature above the melting point of a solder to be used, applying a thin film of solder to desired portions of the surface of said shell, placing said shell in a suitable die while the solder is still molten, and pouring anti-friction metal in molten condition therein, into contact with the solder film.

2. A method of making bearings, comprising, casting an aluminum alloy shell in a metal die, heating the shell to a temperature not less than 350° F., applying a thin film of solder to desired portions of the surface of said shell, and applying anti-friction metal in molten condition to the solder-bearing surface while the solder is still molten.

3. A method of making bearings comprising forming an aluminum alloy shell, heating the same to a temperature above the melting point of a solder to be used, applying a solder to a surface of said shell, and scouring said surface, when the solder is in molten condition, with a metallic scratch brush until the desired surface is covered with a thin film of solder, and applying anti-friction metal in molten condition to the solder-bearing surface while the solder is molten.

4. A method of making bearings, comprising, forming an aluminum alloy shell, heating the same to a temperature above the melting point of a solder to be used, applying a solder to a surface of said shell, in a thin film, placing said shell in a suitable die while the solder is still molten and the shell has a temperature above the melting point of the solder, and immediately pouring anti-friction metal in molten condition into said die, into contact with the solder film.

This specification signed and witnessed this 13th day of November, 1918.

CHARLES PACK.
HERMAN H. DOEHLER.

Witnesses:
H. MAACK,
EDGAR F. BLESSING.